United States Patent [19]

Lehmann

[11] Patent Number: 4,726,691
[45] Date of Patent: Feb. 23, 1988

[54] HYDROSTATIC SUPPORT ARRANGEMENT

[75] Inventor: Rolf Lehmann, Rudolfstetten, Switzerland

[73] Assignee: Sulzer Escher Wyss AG, Zürich, Switzerland

[21] Appl. No.: 69,491

[22] Filed: Jul. 2, 1987

[30] Foreign Application Priority Data

Jul. 8, 1986 [CH] Switzerland ............... 02747/86

[51] Int. Cl.$^4$ ............................................. F16C 32/06
[52] U.S. Cl. ................................ 384/99; 29/116 AD
[58] Field of Search ............... 384/99, 115, 113, 114, 384/107; 29/116 AD

[56] References Cited

U.S. PATENT DOCUMENTS

| | | | |
|---|---|---|---|
| 4,074,624 | 2/1978 | Biörnstad et al. | 29/116 AD |
| 4,404,724 | 9/1983 | Christ et al. | 384/99 |
| 4,464,921 | 8/1984 | Surat | 29/116 AD |
| 4,514,887 | 5/1985 | Rauf et al. | 384/99 |

Primary Examiner—Lenard A. Footland

[57] ABSTRACT

The hydrostatic support arrangement comprises a piston-and-cylinder unit and the piston thereof is provided with a bearing shoe. The hydrostatic support arrangement is provided with a separate supply of pressure oil into the chamber of the cylinder of the piston-and-cylinder unit and to a further chamber arranged between the piston and the bearing shoe. The pressure oil passes from this further chamber through throttle bores to stabilizing pockets of the bearing shoe. A bearing pump for the supply of the pressure oil to the further chamber of the bearing shoe comprises a volumetric pump having a high delivery capacity for the delivery of large quantities of oil, while a pressure pump for the supply of the pressure oil to the cylinder of the piston-and-cylinder unit comprises a pressure-regulated pump having a smaller delivery capacity for delivering smaller quantities of oil. The bearing pump and the pressure pump are operatively interconnected such that the bearing pump delivers pressure oil to both the pressure pump and the further chamber of the bearing shoe.

5 Claims, 2 Drawing Figures

HYDROSTATIC SUPPORT ARRANGEMENT

BACKGROUND OF THE INVENTION

The present invention broadly relates to a new and improved construction of a hydrostatic support or bearing arrangement or element.

In its more specific aspects, the present invention relates to a new and improved construction of a hydrostatic support arrangement or element comprising a piston-and-cylinder unit or device for producing a hydrostatic pressing force. The piston-and-cylinder unit has the piston thereof provided with a bearing shoe, the effective bearing surface or surface area of which is greater than the effective surface or surface area of the piston. A hydraulic pressure or pressurized medium is supplied to the piston-and-cylinder unit and the bearing shoe, and the piston-and-cylinder unit and the bearing shoe are connected to separate supply lines or conduits.

Heretofore known constructions of hydrostatic support arrangements or elements, for example, as disclosed in German Patent No. 1,193,792, published May 26, 1965, U.S. Pat. No. 4,113,325, granted Sept. 12, 1978, U.S. Pat. No. 4,091,517, granted May 30, 1978, and U.S. Pat. No. 4,099,802, granted July 11, 1978, work satisfactorily for many applications, particularly where low pressing forces are involved. However, in the presence of larger pressing forces, for example, as arise when rolling metal, the energy consumption is undesirably high.

SUMMARY OF THE INVENTION

Therefore, with the foregoing in mind it is a primary object of the present invention to provide a new and improved construction of a hydrostatic support or bearing arrangement which is not afflicted with the aforementioned drawbacks and shortcomings of the prior art constructions.

Another important object of the present invention aims at the provision of an improved construction of a hydrostatic support or bearing arrangement which has a lower energy consumption, particularly when exerting higher pressing forces.

Still a further significant object of the present invention is directed to the provision of an improved construction of hydrostatic support or bearing arrangement which is relatively simple in design, quite economical to manufacture, highly reliable in operation, not readily subject to breakdown or malfunction, requires a minimum of maintenance and service, and has comparatively low energy requirements.

Now in order to implement these and still further objects of the invention which will become more readily apparent as the description proceeds, the hydrostatic support or bearing arrangement of the present invention is manifested by the features that a pressure pump and a bearing pump are provided for the separate supply lines or conduits. The pressure of the pressure pump for building up or exerting the pressing force is greater than the pressure exerted by the bearing pump for lubricating the bearing surface of the bearing shoe. Conversely, the bearing pump delivers a greater quantity of oil, that is to say, has a greater delivery capacity than the pressure pump. Furthermore, the bearing pump comprises a volumetric pump delivering an essentially or substantially constant quantity of oil per unit of time, in other words has an essentially or substantially constant delivery capacity per unit of time, whereas the pressure pump comprises a pump operating at a substantially constant feed or delivery pressure.

By dividing the supply of pressure medium to the piston-and-cylinder unit and the bearing shoe, there is achieved the beneficial result that there can be used a high-pressure pump delivering a pressure of, for example, 600 bar for generating the pressing force. This high-pressure pump has, however, a small energy consumption. Since the power consumption or requirements of a pump is proportional to the product of the pump pressure and the volumetric flow, the power consumption approaches zero as the volumetric flow approaches zero.

In contrast thereto, the bearing pump has a large volumetric flow. The pressure on the upper side of the bearing shoe or element is thereby automatically adjusted, since the piston moves in the related cylinder or cylinder chamber until the forces acting on the bearing surface are as large as the forces acting on the piston. If the surface area or area of the bearing shoe or element is twice as great as that of the piston, then the pressure acting upon the bearing shoe is about half as large as that of the pressure in the piston-and-cylinder unit.

Thus, when the hydrostatic support or bearing arrangement is exerting a large bearing or carrying force, the pressure in the bearing shoe is about half as large as the pressure in the piston-and-cylinder unit. The pumping capacity or output is therefore about half as great than compared to the case where the cylinder or cylinder chamber is connected with the bearing shoe by throttle bores.

A particular advantage is realized when the pressure pump is operatively connected in flow communication with the bearing pump, by connecting the suction line or conduit of the pressure pump to the delivery or supply line or conduit of the bearing pump. Since the pressure of the bearing pump is adjusted in proportion to the surface areas or areas of the piston and the bearing shoe, for example, in the ratio of 1:2, the pressure pump thus receives a prepressure or supply pressure corresponding to about half the pressure of the piston-and-cylinder unit. Therefore, for example, the abovementioned pressure of 600 bar in the cylinder or cylinder chamber can be obtained by a pump delivering approximately half that pressure.

Another advantageous embodiment is realized by positioning volume dividers between the bearing pump and the individual bearing shoes in a bearing or support device having hydrostatic support arrangements or elements arranged adjacent to one another, so that every bearing shoe receives the same quantity of oil which is delivered from a common pump. Such an arrangement is useful in the case of, for example, controlled deflection rolls where a plurality of adjacently arranged hydrostatic support arrangements or elements are present.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
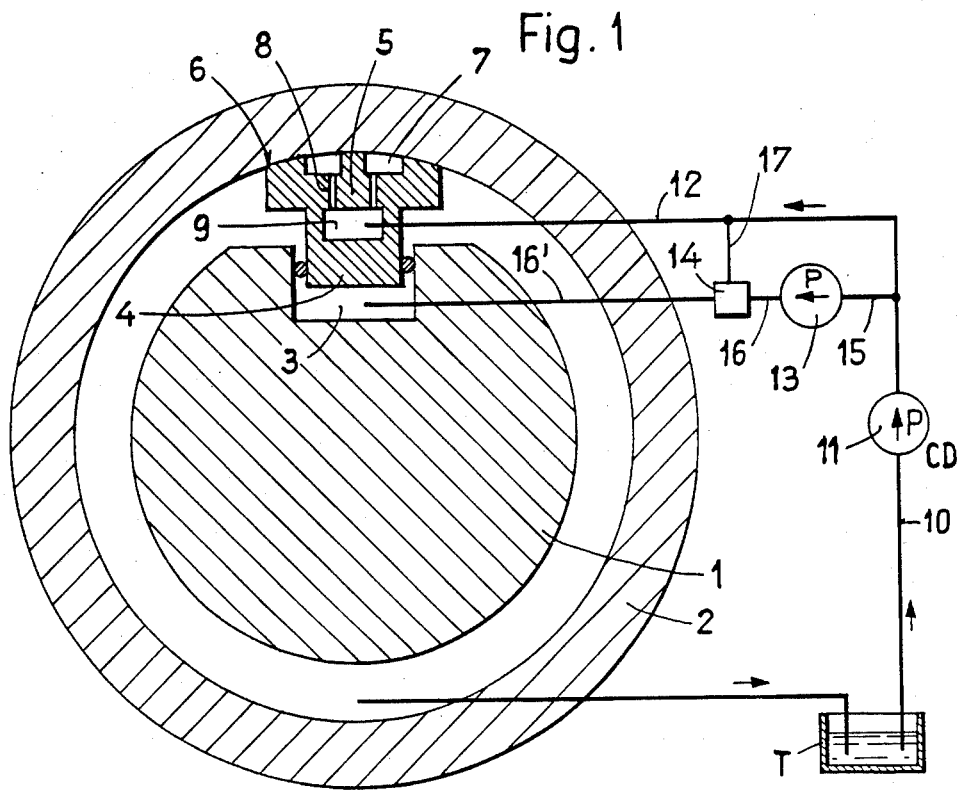
FIG. 1 is a schematic sectional view of a roll or roll structure, such as a controlled deflection roll, equipped with the inventive hydrostatic support arrangement or element.

Describing now the drawings, it is to be understood that to simplify the showing thereof only enough of the structure of the hydraulic support or bearing arrangement or element has been illustrated therein as is needed to enable one skilled in the art to readily understand the underlying principles and concepts of the present invention. Turning now specifically to FIG. 1 of the drawings, there is depicted therein, by way of example, a controlled deflection roll comprising a stationary support or carrier 1 and a rotatable roll shell or jacket 2. Bores 3 or the like defining cylinders or cylinder chambers are appropriately formed in the stationary support or carrier 1 and a respective movable piston 4 is sealingly and inclinably guided in each of the related bores 3. The bore 3, which defines a corresponding cylinder or cylinder chamber, together with the related or associated piston 4, defines a piston-and-cylinder unit 3,4. Each piston 4 is connected with a bearing shoe or element 5 which possesses a bearing surface 6 provided with hydrostatic stabilizing or stabilization pockets 7. The stabilizing pockets 7 are connected by throttle bores or throttle passages 8 with a chamber 9 located between the piston 4 and the bearing shoe 5.

The supply of pressurized fluid medium, typically oil, is effected from a reservoir or container T by means of a bearing pump 11 possessing an essentially constant volumetric flow through a line or conduit 12 which leads into the chamber 9. From there, the oil passes through the throttle bores or throttle passages 8 into the hydrostatic pockets or hydrostatic stabilizing pockets 7 and forms a hydrostatic lubrication for the bearing surface 6, as also has been described in U.S. Pat. No. 3,802,044, granted Apr. 9, 1974. The piston-and-cylinder unit 3,4 is supplied from a pressure pump 13, the pressure of which is maintained essentially constant by means of a suitable pressure regulator or control means 14. The pressure pump 13 is connected via a suction line or conduit 15 to the delivery or feed line or conduit 12 which leads into the chamber 9. An overflow line or conduit 17 of the pressure regulator or control means 14 likewise discharges into the delivery or feed line or conduit 12. The line or conduit leading from the pressure pump 13 to the pressure regulator or control means 14 has be conveniently designated by reference numeral 16, while the line or conduit leading from the pressure regulator or control means 14 to the cylinder chamber 3 has been conveniently designated by reference character 16'.

In operation, the pressure of the bearing pump 11 for lubricating the hydrostatic bearing or support arrangement and, in particular, the bearing shoe or element 5, is adjusted according to the prevailing load to a value governed by the geometric relationships or conditions and the pressure of the pressure pump 13. However, the pressure prevailing within the chamber 9 is always smaller than the pressure in the cylinder chamber 3, since the bearing surface area or area 6 is greater than the surface area or area of the piston 4 and, for example, is twice the size of this piston surface area or area.

The pressure pump 13 receives the pressure or pressurized oil or other suitable pressurized fluid medium already at an excess pressure with respect to the atmosphere and raises this pressure by a value governed by the pressure regulator or control means 14.

Figure 2:
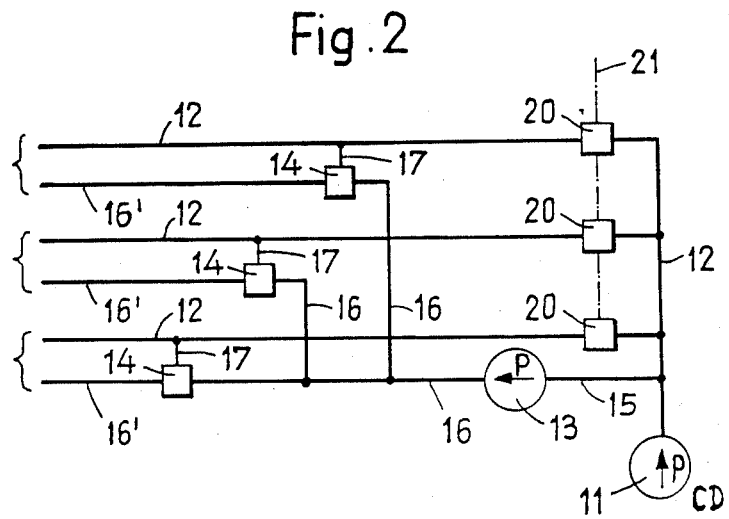
FIG. 2 shows an embodiment of a pump circuit when a plurality of hydrostatic support arrangements or elements are arranged adjacent one another.

FIG. 2 shows an exemplary circuit layout or arrangement for a plurality of adjacently arranged hydrostatic support or bearing arrangements or elements of a controlled deflection roll, wherein the same or analogous components or parts are here conveniently designated with the same reference characters as used in the arrangement of FIG. 1. The only new components or parts shown in FIG. 2 are volume dividers or divider means 20 which ensure that all bearing shoes or elements 5 receive the same quantity of oil per unit of time from the bearing pump 11.

In this respect, for example, as the volume dividers 20 there can be used gear pumps which are connected together by means of a drive shaft 21 and which can also be driven conjointly by means of this drive shaft 21.

The overflow lines or conduits 17 of the pressure regulators or control means 14 preferably lead back into the associated lines or conduits 12. However, the overflowing oil or hydraulic medium can also be returned directly into the reservoir or container T.

In FIG. 1, a representative embodiment of the hydrostatic support or bearing arrangement or element is shown with a cylinder borehole or bore 3 in the support or carrier 1, a movable piston 4 and a bearing shoe or element 5 connected to this movable piston 4. However, the teachings of the invention are applicable to different constructions of hydrostatic support or bearing arrangements, for example, those disclosed in the above-mentioned U.S. Pat. No. 3,802,044, as well as other constructions.

While there are shown and described present preferred embodiments of the invention, it is to be distinctly understood that the invention is not limited thereto, but may be otherwise variously embodied and practiced within the scope of the following claims. Accordingly,

What I claim is:

1. A hydrostatic support arrangement, comprising:
   a piston-and-cylinder unit for the formation of a hydrostatic pressing force;
   said piston-and-cylinder unit including a piston having an effective surface area;
   a bearing shoe having a bearing surface and structured for being hydrostatically lubricated at said bearing surface and provided for the piston of the piston-and-cylinder unit;
   said bearing shoe possessing an effective bearing surface area which is greater than the effective surface area of said piston;
   supply means for infeeding a pressurized hydraulic medium to said piston-and-cylinder unit and to said bearing shoe;
   said supply means including separate supply lines;
   one of said separate supply lines being connected to said piston-and-cylinder unit;
   an other one of said separate supply lines being connected to said bearing shoe;
   a pressure pump and a bearing pump operatively associated with respective ones of said separate supply lines;

said pressure pump for forming the pressing force operating at a pressure which is greater than the pressure of the bearing pump for lubricating the bearing surface of the bearing shoe;

said bearing pump delivering a greater quantity of pressurized hydraulic medium than said pressure pump;

said bearing pump comprising a volumetric pump delivering a substantially constant quantity of pressurized hydraulic medium per unit of time; and said pressure pump comprising a pump operating at a substantially constant feed pressure.

2. The hydrostatic support arrangement as defined in claim 1, further including:

a pressure regulator provided for said pressure pump.

3. The hydrostatic support arrangement as defined in claim 2, wherein:

said pressure pump is operatively connected in flow communication with said bearing pump;

said pressure pump being provided with a suction line; and the suction line of said pressure pump being connected to said separate supply line of said bearing pump.

4. The hydrostatic support arrangement as defined in claim 3, further including:

an overflow line provided for said pressure regulator; and said overflow line being connected to said separate supply line of said bearing pump.

5. A support apparatus comprising a plurality of adjacently arranged hydrostatic support arrangements, each of said adjacently arranged hydrostatic support arrangements comprising:

a piston-and-cylinder unit for the formation of a hydrostatic pressing force;

said piston-and-cylinder unit including a piston having an effective surface area;

a bearing shoe having a bearing surface and equipped for hydrostatic lubrication and provided for the piston of the piston-and-cylinder unit;

said bearing shoe possessing an effective bearing shoe; surface area which is greater than the effective surface area of said piston;

supply means for infeeding a pressurized hydraulic medium to said piston-and-cylinder unit and to said bearing shoe;

said supply means including separate supply lines;

one of said separate supply lines being connected to said piston-and-cylinder unit;

an other one of said separate supply lines being connected to said bearing shoe;

a pressure pump and a bearing pump operatively associated with predeterminate ones of said supply lines;

said pressure pump for forming the pressing force operating at a pressure which is greater than the pressure of the bearing pump for lubricating the bearing surface of the bearing shoe;

said bearing pump delivering a greater quantity of pressurized hydraulic medium than said pressure pump;

said bearing pump comprising a volumetric pump delivering a substantially constant quantity of pressurized hydraulic medium per unit of time;

said pressure pump comprising a pump delivering a substantially constant feed pressure; and volume dividers positioned between said bearing pump and individual bearing shoes of said plurality of adjacently arranged hydrostatic support arrangements.

* * * * *

UNITED STATES PATENT AND TRADEMARK OFFICE
CERTIFICATE OF CORRECTION

PATENT NO. : 4,726,691

DATED : February 23, 1988

INVENTOR(S) : ROLF LEHMANN

It is certified that error appears in the above-identified patent and that said Letters Patent is hereby corrected as shown below:

Column 3, line 55, after "has" please delete "be" and insert --been--

Column 6, line 7, at the beginning of the line, please delete "shoe;"

Signed and Sealed this

Twelfth Day of July, 1988

Attest:

DONALD J. QUIGG

Attesting Officer

Commissioner of Patents and Trademarks